United States Patent
Thormann

(10) Patent No.: US 10,343,074 B2
(45) Date of Patent: Jul. 9, 2019

(54) FANTASY SPORTS SYSTEM

(71) Applicant: David A. Thormann, Merrillville, IN (US)

(72) Inventor: David A. Thormann, Merrillville, IN (US)

( * ) Notice: Subject to any disclaimer, the term of this patent is extended or adjusted under 35 U.S.C. 154(b) by 0 days.

(21) Appl. No.: 15/589,580

(22) Filed: May 8, 2017

(65) Prior Publication Data

US 2017/0319970 A1     Nov. 9, 2017

Related U.S. Application Data

(60) Provisional application No. 62/332,930, filed on May 6, 2016.

(51) Int. Cl.
| | |
|---|---|
| A63F 13/00 | (2014.01) |
| A63F 9/24 | (2006.01) |
| G06F 19/00 | (2018.01) |
| A63F 13/828 | (2014.01) |
| A63F 13/65 | (2014.01) |
| A63F 13/798 | (2014.01) |
| G06Q 10/10 | (2012.01) |
| G06F 17/18 | (2006.01) |
| A63F 13/30 | (2014.01) |

(52) U.S. Cl.
CPC ............ *A63F 13/828* (2014.09); *A63F 13/65* (2014.09); *A63F 13/798* (2014.09); *G06F 17/18* (2013.01); *G06Q 10/10* (2013.01); *A63F 13/30* (2014.09); *A63F 2300/407* (2013.01)

(58) Field of Classification Search
CPC ...... A63F 13/65; A63F 13/798; A63F 13/828; A63B 24/0062; G09B 19/0038; G06F 19/3481
See application file for complete search history.

(56) References Cited

U.S. PATENT DOCUMENTS

| | | | | |
|---|---|---|---|---|
| 2006/0105827 | A1* | 5/2006 | Metzger | A63F 13/10 463/9 |
| 2006/0258421 | A1* | 11/2006 | Nicholas | A63F 13/12 463/4 |
| 2007/0233585 | A1* | 10/2007 | Ben Simon | G06Q 40/00 705/35 |
| 2008/0161113 | A1* | 7/2008 | Hansen | A63F 13/12 463/42 |
| 2008/0281444 | A1* | 11/2008 | Krieger | A63F 13/12 700/91 |
| 2010/0184495 | A1* | 7/2010 | Levy | A63F 13/12 463/4 |

(Continued)

*Primary Examiner* — Milap Shah

(74) *Attorney, Agent, or Firm* — Richards Patent Law P.C.

(57) ABSTRACT

Fantasy sports systems and methods comprising receiving a fantasy lineup roster including a plurality of players, each player assigned to a playing position and one or more of the plurality of players further assigned to one or more alternative positions, assigning scores to each of the plurality of players based on statistics derived from one or more real life competitions, receiving a notification of at least one substitution event, each substitution event associated with one of the players and also associated with a substitution segment within the one or more real life competitions, and calculating a fantasy lineup score by aggregating the assigned scores of each of the players assigned to a playing position.

20 Claims, 9 Drawing Sheets

| Player Name | Playing Position | Alternative Position | Alternative Position Modifier | Active on Roster | Points Per Game Average |
|---|---|---|---|---|---|
| Tom Brady | Quarterback | N/A | N/A | Yes | 4 |
| Marshawn Lynch | Running Back | Wide Receiver | 0.6 | Yes | 6 |
| Martellus Bennett | Tight End | Wide Receiver | 0.9 | Yes | 2 |
| Julio Jones | Wide Receiver | Tight End | 0.8 | Yes | 4 |
| Odell Beckham Jr. | Wide Receiver | Tight End | 0.8 | Yes | 3 |
| Amari Cooper | Wide Receiver | Tight End | 0.8 | Yes | 2 |
| Travis Frederick | Center | Guard | 0.9 | Yes | 1 |
| Zack Martin | Guard | Center | 0.9 | Yes | 1 |
| Josh Sitton | Guard | Tackle | 0.9 | Yes | 1 |
| Joe Thomas | Tackle | Guard | 0.9 | Yes | 1 |
| Tyrone Smith | Tackle | Guard | 0.9 | Yes | 1 |
| Russel Wilson | Quarterback | Running Back | 0.5 | No | 3 |
| Jordan Howard | Running Back | Wide Receiver | 0.7 | No | 5 |
| Travis Kelce | Tight End | Wide Receiver | 0.8 | No | 2 |
| T.J. Land | Guard | Center | 0.9 | No | 1 |
| Terron Armstead | Tackle | Guard | 0.9 | No | 1 |

(56) References Cited

U.S. PATENT DOCUMENTS

| | | | | |
|---|---|---|---|---|
| 2010/0279754 | A1* | 11/2010 | Tanenbaum | G06Q 50/34 463/3 |
| 2010/0285887 | A1* | 11/2010 | Nicholas | A63F 13/12 463/42 |
| 2012/0270619 | A1* | 10/2012 | Nicholas | A63F 13/12 463/9 |
| 2013/0053989 | A1* | 2/2013 | Miller | A63F 13/828 700/91 |
| 2013/0079073 | A1* | 3/2013 | Sharifi | A63F 13/10 463/3 |
| 2013/0222597 | A1* | 8/2013 | Brink | G06Q 30/0211 348/157 |
| 2014/0031105 | A1* | 1/2014 | Givant | G07F 17/3276 463/25 |
| 2014/0274411 | A1* | 9/2014 | Moffett | A63F 13/30 463/42 |
| 2015/0005072 | A1* | 1/2015 | Lempel | A63F 13/65 463/42 |
| 2015/0209679 | A1* | 7/2015 | Givant | A63F 13/828 463/25 |
| 2015/0360133 | A1* | 12/2015 | MacCallum | A63F 13/828 463/42 |
| 2016/0045825 | A1* | 2/2016 | Kehoe | A63F 13/795 463/29 |
| 2016/0051895 | A1* | 2/2016 | Hood | A63F 13/35 463/29 |
| 2016/0071355 | A1* | 3/2016 | Morrison | G07F 17/3239 463/7 |
| 2016/0101353 | A1* | 4/2016 | Kehoe | A63F 13/31 463/42 |
| 2016/0310848 | A1* | 10/2016 | Sirianni | A63F 13/828 |

\* cited by examiner

| Player Name | Playing Position | Alternative Position | Active on Roster | Playing Position on Roster | Injured |
|---|---|---|---|---|---|
| Tom Brady | Quarterback | N/A | Yes | Quarterback | No |
| Marshawn Lynch | Running Back | Wide Receiver | Yes | Running Back | No |
| Martellus Bennett | Tight End | Wide Receiver | Yes | Tight End | No |
| Julio Jones | Wide Receiver | Tight End | Yes | Wide Receiver 1 | No |
| Odell Beckham Jr. | Wide Receiver | Tight End | Yes | Wide Receiver 2 | No |
| Amari Cooper | Wide Receiver | Tight End | Yes | Wide Receiver 3 | No |
| Travis Frederick | Center | Guard | Yes | Center | No |
| Zack Martin | Guard | Center | Yes | Guard 1 | No |
| Josh Sitton | Guard | Tackle | Yes | Guard 2 | No |
| Joe Thomas | Tackle | Guard | Yes | Tackle 1 | No |
| Tyrone Smith | Tackle | Guard | Yes | Tackle 2 | No |
| Russel Wilson | Quarterback | Running Back | No | N/A | Yes |
| Jordan Howard | Running Back | Wide Receiver | No | N/A | No |
| Travis Kelce | Tight End | Wide Receiver | No | N/A | No |
| T.J. Land | Guard | Center | No | N/A | No |
| Terron Armstead | Tackle | Guard | No | N/A | No |

FIG. 3A

| Player Name | Playing Position on Roster | Substitution Interval | Points | Modifier |
|---|---|---|---|---|
| Tom Brady | Quarterback | Quarter 1 | 2 | N/A |
| Marshawn Lynch | Running Back | Quarter 1 | 4 | N/A |
| Martellus Bennett | Tight End | Quarter 1 | 2 | N/A |
| Julio Jones | Wide Receiver 1 | Quarter 1 | 1 | N/A |
| Odell Beckham Jr. | Wide Receiver 2 | Quarter 1 | 1 | N/A |
| Amari Cooper | Wide Receiver 3 | Quarter 1 | 0 | N/A |
| Travis Frederick | Center | Quarter 1 | 1 | N/A |
| Zack Martin | Guard 1 | Quarter 1 | 1 | N/A |
| Josh Sitton | Guard 2 | Quarter 1 | 1 | N/A |
| Joe Thomas | Tackle 1 | Quarter 1 | 1 | N/A |
| Tyrone Smith | Tackle 2 | Quarter 1 | 0 | N/A |

FIG. 3B

| Player Name | Playing Position | Alternative Position | Active on Roster | Playing Position on Roster | Injured |
|---|---|---|---|---|---|
| Tom Brady | Quarterback | N/A | Yes | Quarterback | No |
| Marshawn Lynch | Running Back | Wide Receiver | Yes | Running Back | No |
| Martellus Bennett | Tight End | Wide Receiver | Yes | Tight End | No |
| Julio Jones | Wide Receiver | Tight End | No | N/A | Yes |
| Odell Beckham Jr. | Wide Receiver | Tight End | Yes | Wide Receiver 2 | No |
| Amari Cooper | Wide Receiver | Tight End | Yes | Wide Receiver 3 | No |
| Travis Frederick | Center | Guard | Yes | Center | No |
| Zack Martin | Guard | Center | Yes | Guard 1 | No |
| Josh Sitton | Guard | Tackle | Yes | Guard 2 | No |
| Joe Thomas | Tackle | Guard | Yes | Tackle 1 | No |
| Tyrone Smith | Tackle | Guard | Yes | Tackle 2 | No |
| Russel Wilson | Quarterback | Running Back | No | N/A | Yes |
| Jordan Howard | Running Back | Wide Receiver | Yes | Wide Receiver 1 | No |
| Travis Kelce | Tight End | Wide Receiver | No | N/A | No |
| T.J. Land | Guard | Center | No | N/A | No |
| Terron Armstead | Tackle | Guard | No | N/A | No |

FIG. 3C

| Player Name | Playing Position | Alternative Position | Alternative Position Modifier | Active on Roster | Points Per Game Average |
|---|---|---|---|---|---|
| Tom Brady | Quarterback | N/A | N/A | Yes | 4 |
| Marshawn Lynch | Running Back | Wide Receiver | 0.6 | Yes | 6 |
| Martellus Bennett | Tight End | Wide Receiver | 0.9 | Yes | 2 |
| Julio Jones | Wide Receiver | Tight End | 0.8 | Yes | 4 |
| Odell Beckham Jr. | Wide Receiver | Tight End | 0.8 | Yes | 3 |
| Amari Cooper | Wide Receiver | Tight End | 0.8 | Yes | 2 |
| Travis Frederick | Center | Guard | 0.9 | Yes | 1 |
| Zack Martin | Guard | Center | 0.9 | Yes | 1 |
| Josh Sitton | Guard | Tackle | 0.9 | Yes | 1 |
| Joe Thomas | Tackle | Guard | 0.9 | Yes | 1 |
| Tyrone Smith | Tackle | Guard | 0.9 | Yes | 1 |
| Russel Wilson | Quarterback | Running Back | 0.5 | No | 3 |
| Jordan Howard | Running Back | Wide Receiver | 0.7 | No | 5 |
| Travis Kelce | Tight End | Wide Receiver | 0.8 | No | 2 |
| T.J. Land | Guard | Center | 0.9 | No | 1 |
| Terron Armstead | Tackle | Guard | 0.9 | No | 1 |

FIG. 3D

| Player Name | Playing Position | Substitution Interval | Points | Modifier |
|---|---|---|---|---|
| Tom Brady | Quarterback | Quarter 2 | 2 | N/A |
| Marshawn Lynch | Running Back | Quarter 2 | 1 | N/A |
| Martellus Bennett | Tight End | Quarter 2 | 0 | N/A |
| Jordan Howard | Wide Receiver 1 | Quarter 2 | 2 | 0.7 |
| Odell Beckham Jr. | Wide Receiver 2 | Quarter 2 | 0 | N/A |
| Amari Cooper | Wide Receiver 3 | Quarter 2 | 1 | N/A |
| Travis Frederick | Center | Quarter 2 | 1 | N/A |
| Zack Martin | Guard 1 | Quarter 2 | 1 | N/A |
| Josh Sitton | Guard 1 | Quarter 2 | 0 | N/A |
| Joe Thomas | Tackle 1 | Quarter 2 | 1 | N/A |
| Tyrone Smith | Tackle 1 | Quarter 2 | 0 | N/A |

FIG. 3E

| Player Name | Playing Position | Substitution Interval | Points | Modifier |
|---|---|---|---|---|
| Julio Jones | Wide Receiver 1 | Quarter 1 | 1 | N/A |
| Jordan Howard | Wide Receiver 1 | Quarter 2 | 2 | 0.7 |
| Jordan Howard | Wide Receiver 1 | Quarter 3 | 3 | 0.7 |
| Julio Jones | Wide Receiver 1 | Quarter 4 | 2 | N/A |

FIG. 4

| OFFENSE | Required Players per Position | | | | | | | |
|---|---|---|---|---|---|---|---|---|
| Formation | QB | RB | FB | TE | WR | C | G | T |
| Formation 1 | 1 | 0 | 0 | 2 | 3 | 1 | 2 | 2 |
| Formation 2 | 1 | 1 | 0 | 1 | 3 | 1 | 2 | 2 |
| Formation 3 | 1 | 1 | 0 | 2 | 2 | 1 | 2 | 2 |
| Formation 4 | 1 | 1 | 1 | 0 | 3 | 1 | 2 | 2 |
| Formation 5 | 1 | 1 | 1 | 1 | 2 | 1 | 2 | 2 |
| Formation 6 | 1 | 1 | 0 | 3 | 1 | 1 | 2 | 2 |
| Formation 7 | 0 | 1 | 0 | 2 | 3 | 1 | 2 | 2 |

FIG. 5A

| DEFENSE | Required Players per Position | | | | | |
|---|---|---|---|---|---|---|
| Formation | DE | DT | OL | IL | CB | S |
| Formation 1 | 2 | 1 | 2 | 2 | 2 | 2 |
| Formation 2 | 2 | 1 | 1 | 1 | 4 | 2 |
| Formation 3 | 2 | 1 | 2 | 1 | 3 | 2 |
| Formation 4 | 2 | 2 | 2 | 1 | 2 | 2 |
| Formation 5 | 2 | 2 |  | 1 | 4 | 2 |
| Formation 6 | 2 | 2 | 1 | 1 | 3 | 2 |
| Formation 7 | 2 | 2 | 2 | 2 | 2 | 1 |

FIG. 5B

| SPECIAL TEAMS | | | | |
|---|---|---|---|---|
| Formation | K | P | KR | PR |
| Field Goal or Extra Point | 1 | 0 | 0 | 0 |
| Punt | 0 | 1 | 0 | 0 |
| Receive Kickoff | 0 | 0 | 1 | 0 |
| Receive Punt | 0 | 0 | 0 | 1 |

FIG. 5C

| Depth Chart Position | Quarterback |
|---|---|
| 1 | Tom Brady |
| 2 | Russel Wilson |
| 3 | N/A |
| Depth Chart Position | Wide Receiver |
| 1 | Julio Jones |
| 2 | Odell Beckham Jr. |
| 3 | Amari Cooper |
| 4 | Travis Kelce |
| 5 | Jordan Howard |
| 6 | Martellus Bennett |
| Depth Chart Position | Running Back |
| 1 | Marshawn Lynch |
| 2 | Jordan Howard |
| 3 | Russel Wilson |

FIG. 6

FANTASY SPORTS SYSTEM

BACKGROUND OF THE INVENTION

The present subject matter relates generally to a fantasy sports system. More specifically, the present invention relates to both systems and methods for managing fantasy sports rosters and scoring fantasy sports competitions.

Fantasy sports are extremely popular throughout the world. Likely the most popular form of fantasy sport is fantasy football with close to 75 million American's taking part in at least one fantasy football competition. Fantasy football competitions are typically set up in the form of a fantasy league. Each league has a set number of teams and the managers of these teams select football players from the National Football League (NFL) to be assigned to their team. Usually when a player is selected by one team in a league, no other team may select that player and thus a good deal of thought and strategy typically goes into assembling each team's fantasy roster of NFL players. Once team rosters are established, the teams in a fantasy league are matched up in one-on-one competitions based on a rotating weekly schedule, with a winner from each matchup being determined based off which team's roster of players has scored more fantasy points. These fantasy points are awarded for positively contributing (or decremented for negatively contributing) during an NFL game (for example, scoring a touchdown). The head-to-head matchups go on for a set number of weeks and eventually a league champion is crowned based off either the best record in the league or by winning the league playoffs.

While fantasy football is very popular, as evidenced by the number of players in America alone, it is not without issues and room for improvement. For instance, when a fantasy game is played, each team manager is limited to selecting a portion of the players from their team's roster to create a starting lineup. A starting lineup consists of one player from the roster exclusively assigned to an available starting position (i.e., quarterback, running back, defensive end, 2 or 3 wide receivers, etc.). Only the players included in the starting lineup compete in the fantasy matchup and have the opportunity to accumulate fantasy points. Consequently, all unselected players do not compete in the contest and have no chance of receiving any fantasy points for that game.

This restriction of only selecting game starters becomes a much greater problem when a selected starter becomes unavailable. In the NFL, a player's playing status may change before or during the game. NFL coaches make pre-game, game-time, and in-game decisions that impact a player's playing status. Further, player injuries happen frequently during an NFL game. When a player becomes unavailable, no fantasy points can be earned for that player. Although a team's roster often includes one or more additional players that may play at the unavailable player's position, no substitution can be made during a fantasy competition.

Although the available starting positions and the values for calculating fantasy scores may differ from league to league, the basic principles of setting a fixed starting lineup and calculating fantasy points remain fundamentally unchanged across all fantasy football leagues. Some fantasy games have attempted to allow players to be designated as possible substitution players if a given situation arises, but these attempts have failed to allow for any sort of meaningful strategy to be implemented since substitutions are limited to strictly to player-for-player lineup swaps. By preselecting substitute players, a fantasy manager will almost always select the positions that typically create the most points. If any other positions have the starting player become unavailable, no substitution will be made.

Another example of an issue with fantasy sports is that the level of skill of real world players is not accounted for in current fantasy sports scoring schemes. While accomplishments in a game are attributed points (e.g., sacks, touchdowns, field goals, etc.); current fantasy sports systems do not account for the relative level of difficulty of achieving such an accomplishment. A helpful example of this issue could be that of two running backs scoring three touchdowns in a game. Normally, this would be a boon for the fantasy teams which have the running backs in their starting lineups. However, if one of the running backs scored these touchdowns against the NFL's toughest defense and the other back was pitted against the NFL's weakest, the difficulty of achieving the feat for the back facing a great defense is left unaccounted for. Additionally in fantasy football, a field goal scored in the first quarter is worth the same amount of points as an overtime game winning field goal. This disconnect between fantasy points and the magnitude of real life player accomplishments allows for fantasy football victories to be achieved by picking players with beneficial matchups rather than based off their efforts in games.

Accordingly, there is a need for systems and methods for managing fantasy sports rosters and scoring fantasy sports competitions, as described herein.

BRIEF SUMMARY OF THE INVENTION

To meet the needs described above and others, the present disclosure provides systems and methods for managing fantasy sports rosters and scoring fantasy sports competitions.

One embodiment of the invention is a computerized system which features an end-user interface which allows fantasy sports (in this embodiment fantasy football, but the system may be used to create fantasy competitions for any professional, collegiate, or other form of sporting event) leagues to be set up and managed by users. This end user interface may be a hosted website which incorporates real time data from a sport's data statistics source, either external or internal. The data provided to the system website may include information on team rosters, game performance statistics, and any other relevant data used for fantasy sports scoring.

This system embodiment also features an interface through which users may draft teams of NFL players in the previously mentioned leagues and manage these teams for the duration of the fantasy league's season. Management of each fantasy team is carried out via the system's depth chart manager (DCM), described here as an isolated system function which in reality is seamlessly integrated into the fantasy sports system.

The DCM allows a fantasy team's manager to closely emulate the action that would be taken by an actual NFL team's head coach during a game. Practically, such an effect is achieved by the DCM providing the ability for fantasy sports team managers to set a sequential queue (depth chart) of players at every available position on a team within a fantasy sports league. Therefore, every available player has the potential of participating in each game if a certain player or players become unavailable. Like real-life teams, if a player becomes unavailable on a fantasy roster, the next available player is substituted into the game based on the player's placement in the DCM's depth chart.

To further improve the realism of fantasy sports competitions, the DCM contains a positions matrix. The matrix defines all valid playing positions and associated alternate position(s) (if any) based on a player's natural playing position. Also, an efficiency rating (percentage) is defined for each position. A natural playing position is the position the real-life team assigned the player. An alternate playing position is another position that the player is capable of playing (defined in the matrix based off real NFL statistics). The DCM allows a player to be placed in the depth chart at the player's natural playing position or at a defined alternate position that the player is capable of playing. When a player plays at an alternate position, it is assumed that the player will be less effective than at his natural playing position. As a result, a player participating in an alternate position will have a reduced efficiency rating compared to playing at his natural position.

For example, an offensive tackle (player's natural position) may be played at an offensive guard (valid alternate position). When scoring the player, assume that he earned 30 points if playing at his natural position (100% efficiency). However, if instead, the player participated at an alternate position, he was scored at 24 points (80% efficiency). In this way, a player capable of playing multiple positions can be compared and rated more fairly in relation to players who play the alternate position(s) as their natural position.

This embodiment and others may also feature a point scoring system that provides modified scoring for player's accomplishments on the field based off how difficult (or easy) it was to accomplish an achievement during the game. For example, points may be awarded using a sliding scale that accounts for the degree of difficulty of a given achievement. Modifications may be made based on an individual player involved in the play. For example, when a player intercepts a star quarterback, the intercepting player is awarded a greater number of points than for an ordinary interception. Similarly, modifications may be made based on the team, or the specific unit of the team (e.g., nickel defensive unit), involved in the play. For example, a touchdown scored by a running back against a higher ranked defense (or, even more specifically, a defense ranked highly against the run) may be worth more points than a rushing touchdown against a weaker defensive unit.

In some embodiments, the modified point scoring system utilizes an advanced scoring matrix that need not be limited to just accounting for the quality of players and teams. This matrix can also account for clutch plays (determined off the time left in a game, the score, etc.), weather conditions, or any other factors which can impact the difficulty of accomplishing an achievement during a game. The scoring modifiers may also be awarded, removed, and modified by the system constantly throughout the game in response to positive or negative play of the players (e.g., penalties), changing weather conditions, the importance of the game (e.g., the game is to clinch a playoff spot), or any other factors.

As an example of the advanced scoring matrix mentioned above, in a fantasy football competition conducted as described herein, a default score of 2 fantasy points may be granted to a player who intercepts a pass during an NFL game. If advanced scoring is opted for by the league manager, the score of 2 points awarded for an interception can be multiplied by any number of factors which account for on the field performance. If, for example, the quarterback intercepted was a star player, a modifier of 1.2 may be applied to the score of two; resulting in a fantasy score of 2.4 (2 multiplied by 1.2) being awarded to the intercepting player. Additionally, scoring modifiers may be compounded by the system to produce a higher combined modifier if, for example, the interception discussed above took place in the final minutes of a close game. Since the final moments of a game are typically very important, an interception during this time may be awarded an additional modifier of 0.4. This "clutch" modifier of 0.4 may be combined with the previously mentioned "star player" modifier of 1.2 to award the player a fantasy score of 3.2 for the interception ((1.2+0.4)*2).

In contrast, poor play on the part of a player or the entire team may also be accounted for by the advanced scoring matrix. For example, a penalty may result in a loss of points. Using contextual modifiers, the negative score may be greater magnitude if the penalty occurs in a more important context. For example, a penalty at mid-field in the $1^{st}$ quarter may be less critical than a penalty on the goal line in the $4^{th}$ quarter. Accordingly, the point penalty may be greater for the penalty on the goal line in the $4^{th}$ quarter.

The systems and methods described herein can be implemented in any fantasy sports context. For example, fantasy baseball, fantasy basketball, fantasy hockey, fantasy golf, etc. In an example using fantasy hockey, points may be deducted when a player commits a penalty that leads to a power play for the other team. A power play is awarded when one team commits a foul against the other team. The offending team is penalized by the removal of one player from the ice for a set amount of time and, when such a penalty occurs, the odds of the penalized team giving up a goal significantly increases. Such a detriment can be accounted for by negative points or, as an alternative, a point decrementing modifier can be used in a manner operate inverse to the point incrementing modifier discussed above. For instance, if a player commits a slash (or any other hockey penalty) that results in a power play, their fantasy score may be multiplied by a modifier of 0.9. This would mean if the player had accrued 2 fantasy points, this number would be multiplied by 0.9 for a fantasy score of 1.8 as a reflection of the player's detriment to their team. The advanced scoring matrix may also account for if the power play actually cost the player's team a goal and, if such a negative consequence actually occurred, deduct additional fantasy points from the penalized player. In this case, such an additional deduction may mean adjusting the modifier from 0.9 to 0.7, resulting in the fantasy points (1.4, down from 2 originally) earned by the player being reduced for poor play which resulted in a realized benefit for the other team.

The present invention may also be described as a fantasy sports system (or method of carrying out the following) comprising a memory configured to store a set of instructions and a processor configured to execute the set of instructions, wherein the set of instructions cause the processor to receive a fantasy lineup roster including a plurality of players, each player assigned to a playing position and one or more of the plurality of players further assigned to one or more alternative positions, each alternative position being a backup to a playing position or another alternative position, assign scores to each of the plurality of players based on statistics derived from one or more real life competitions, wherein the assigned scores are segmented in a manner consistent with a plurality of segments within the one or more real life competitions, receive a notification of at least one substitution event, each substitution event associated with one of the players and also associated with a substitution segment within the one or more real life competitions, and calculate a fantasy lineup score by aggregating the assigned scores of each of the players assigned to a playing position. When one of the players mentioned in this paragraph is assigned to a playing position is associated with a notification of a substitution event, the step of calculating a fantasy lineup score further includes substituting the assigned score for the player assigned to the alternative position that is the backup to the playing position for which the notification of the substitution event relates for all segments within the one or more real life competitions that occur after the substitution segment associated with the substitution event occurs.

The real life competitions monitored by the system may include American football games with the segments within the competition being quarters and/or segments within the one or more real life competitions are time ranges related to a game clock. Baseball games may also be monitored by the system and the segments within the one or more real life competitions are innings.

The system may also apply a score reducing modifier to the assigned score for the player assigned to the alternative position that is the backup to the playing position for which the notification of the substitution event relates. The magnitude of the modifier applied for the player may be derived, at least in part, from at least one sports statistic which correlates to an aptitude required for the alternative position at which the player is assigned.

A score modifier may also be applied to the assigned score of a player, the score modifier being derived, at least in part, from temporal data concerning when the assigned score was earned by the player during a real life competition. A score modifier may also be applied to the assigned score of a player, the score modifier being derived, at least in part, from at least one sports statistic which correlates to the relative aptitude of two or more players participating against one another in a real life competition.

The substitution event(s) accounted for by the system may include: injury, illness, ejection, suspension, or benching of a player which occur during a real-life competition. When a substitution occurs, the data regarding such an event may be derived from a sports data source.

A goal of the present invention is to provide fantasy team owners with a more realistic playing experience than what is currently available in fantasy sports. This is accomplished by placing an emphasis on the entire fantasy team. Since each fantasy team in this system has more players than just starters, the depth of a fantasy team at every position is of critical importance since these players may enter a fantasy lineup if a starter becomes unavailable (whether for injury or otherwise). This mirrors the real life need for sports teams to have not only star players, but also capable backup players to fill in for players unavailable during a game.

Another goal of the present invention is to provide an advanced scoring system for fantasy sports. Current fantasy football scoring does not reflect the overall magnitude of the play in NFL games. Instead, the same amounts of points are awarded for the same type of plays (e.g., an interception) and fail to consider factors such as: who was intercepted (e.g., a star player), where the interception happened (e.g., within 20 yards of the other team scoring), when the play occurred (e.g., game winning play), and if any penalties occurred on the play. Such factors can be used to assign point modifiers to fantasy points earned by players and make the overall magnitude of the play in the real world better accounted for in fantasy sports.

An advantage of the present system is that it automates an extremely complicated set of substitutions and provides to the user an interface which allows for these substitutions to be quickly defined and updated. The present invention accounts for player's natural playing positions as well as others at which they are competent and allows users to assign players to a user's fantasy depth chart according to which players are likely to net them the most fantasy points. Additionally, not only are players replaced automatically by the system on a fantasy team's starting line-up when they become unavailable (injury or otherwise), but players are also replaced who are on a bye week. This alleviates the need to constantly monitor a fantasy team and allows users to fully enjoy watching sports or doing other activities while games are occurring.

Another advantage of the present system is that it requires a good deal of thought and skill to formulate a winning team. Fantasy sports are defined as a game of skill and must remain so to avoiding being considered gambling in some places. A user creating a fantasy team using the present system is required to do use a good deal of skill when building depth at each position on a team's roster.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 3A is a roster set by a team manager user.

FIG. 3B is a points scored database for a substitution interval of a competition monitored by the system.

FIG. 3C is a roster automatically updated by the system in response to a substitution event.

FIG. 3D is an Average Points Per Game database.

FIG. 3E is a points scored database for a substitution interval of a competition monitored by the system featuring a substituted player and points modifier.

FIG. 4 is a position score database.

FIG. 5A is a chart of valid offensive player positions that may be chosen by a team manager as part of an embodiment of the fantasy sports system.

FIG. 5B is a chart of valid defensive player positions which may be chosen by a team manager as part of an embodiment of the fantasy sports system.

FIG. 5C is a chart of valid special teams player positions which may be chosen by a team manager as part of an embodiment of the fantasy sports system.

FIG. 6 is an example of a portion of the GUI that the system displays to team manager users.

DETAILED DESCRIPTION OF THE INVENTION

Figure 1:
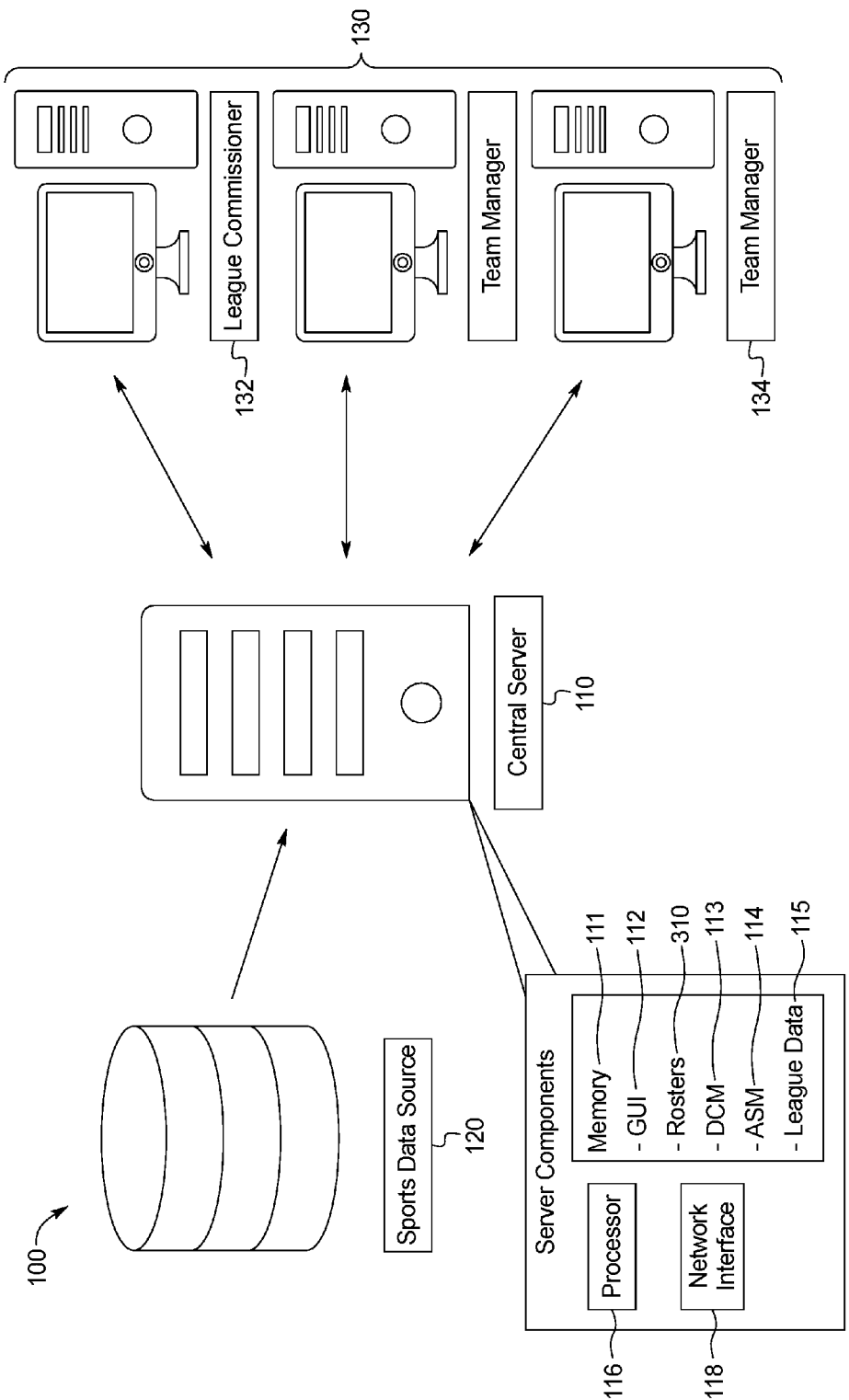
FIG. 1 is a schematic overview of the fantasy sports system.

FIG. 1 is a schematic overview of the fantasy sports system 100. As shown in FIG. 1, the fantasy sports system 100 may feature a centralized server 110 which receives sports data (e.g., statistics) from a sports data source 120 and communicates with a plurality of end users 130. The sports data source 120 may be external (e.g., a sports statistics website) or internal (e.g., an inhouse statistics database). The end users may be league commissioners 132, team managers 134, or users acting as both. These users interact with the centralized server 110 via a graphical user interface (GUI) 112 which may be displayed to the user in the form of a hosted website, mobile device application, or any other functional means. The users may create and manage fantasy sports leagues and teams via the system's GUI 112 and the league data 115 related to such actions is stored on the centralized server's 110 memory 111. Further shown in FIG. 1, the centralized server's memory 111 also stores depth chart manager (DCM) 113 and advanced scoring matrix (ASM) 114 functions utilized by the system 100 to enable support of more complicated fantasy sports competitions. The central server 110 also contains a processor 116 which enables the server to carry out commands based off automatic and manual command inputs and a network interface 118 which enables the central server 110 to communicate with end users 130 and sports data sources 120 via the internet or any other functional means.

Figure 2:
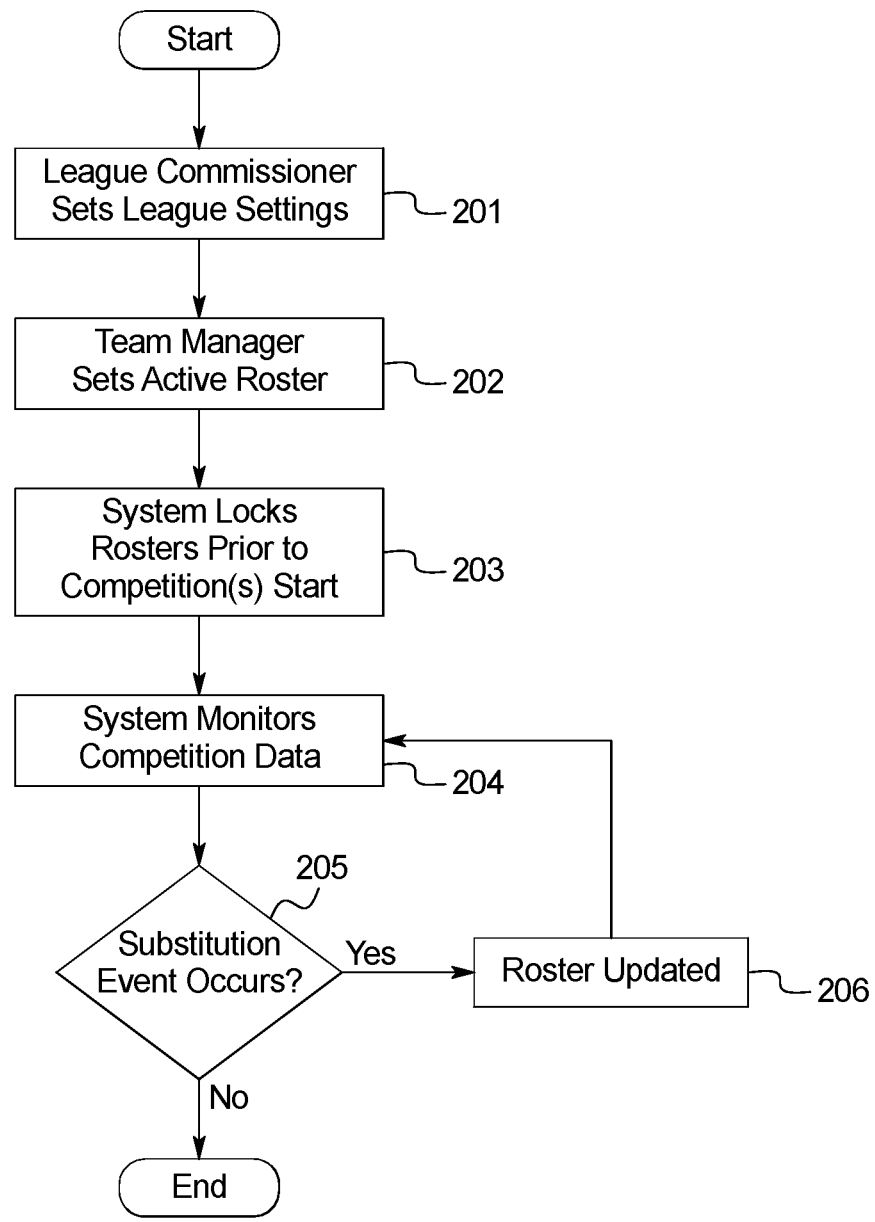
FIG. 2 is a flowchart of the fantasy sports system's depth chart management function.

FIG. 2 is a flowchart of the fantasy sports system's 100 depth chart management function 113. As shown in FIG. 2, at a first step 201, a league commissioner user 132 sets up the league rules for a given fantasy sports league. These league settings define what rules and parameters the fantasy teams within a given league come under. These rules may include what playing positions will make up a team (e.g., the number of running backs, wide receivers, etc.), if in-game substitutions are allowed and the scoring scheme to be used for league games. These settings are managed through a GUI 112 which may be utilized by a league commissioner user 132 and any set-up or changes done through a league management page of the GUI 112 are implemented and reflected via the options selectable within the GUI 112 page shown to team manager users 134 (shown in FIG. 6).

After league settings are established, at a next step 202, team manager user's 134 set up their roster of players (a roster 310 is shown in FIG. 3A). Team manager users 134 place players into a roster 310 which features both starting players and backups who will be automatically substituted by the system 100 if the starter is unavailable. Such substitutions may be partially or fully automated by the system 100.

For example, in one embodiment of automated functionality, the system 100 may take into account players who are cross listed with other positions at which they are competent. If an opening in a starting lineup occurs (e.g., an injury occurs) any player on a given roster 310 who is competent at a given position may fill the open spot. If multiple players on a fantasy roster 310 are competent at the given spot (e.g., a starting wide receiver is injured and two backup players can play wide receiver) whichever backup player has a higher points per game average will be selected to fill the open slot. Such a substitution can occur in real time based off data regarding injuries, etc. obtained from sports data source(s) 120. It should be noted the use of highest points per average score is used here to highlight how the system 100 may function, but the system 100 can use any number of data points and meta data about player performance, weather, game time, historical match-up data, etc. to analyze and elect the best available substitution for a given position.

The system 100 may be set up to monitor for substitution events (e.g., injuries, suspensions, ejections, illness, benching, etc.) during a given competition (e.g., sports game, car race, golf match, etc.) and, in the interest of fairness, the system 100 may lock rosters 310 (featuring players designated as starters and backups) prior to the start of the competition at a third step 203. Once a given competition begins, the system 100, at a fourth step 204 monitors data regarding the competition and if a substitution event occurs at step 205, the system will act automatically to substitute a backup player.

Such substitution may be set to occur based off whether a substitution event occurs within a given substitution interval or segment. For example, during a football game, there are several different substitution intervals (or substitution segments) which may be elected depending on league and/or team settings. Such substitution intervals or segments may include each play of a game, each set of downs, each possession, each quarter, each half, or even on a weekly game-to-game basis. If a substitution event occurs during a competition (step 205) and a starting (or active backup) player becomes unavailable, the system 100 will then substitute the next best available player on the roster 310 (step 206). The system 100 will then continue to monitor competition data (step 204) until another substitution event occurs or the competition ends.

While the system 100 may be adapted to help each team manager optimize their fantasy team's performance, the amount of thought, skill, and work required when building a winning fantasy roster should not be understated. The system 100 merely maximizes a fantasy team's potential, but each user is responsible for selecting players to make up their roster whose performances will reflect positively on each other. The sort of in-depth research required to build a flexible and resilient fantasy roster mimics the work done by real world coaches and general managers and will provide a steep increase in challenge to even the most seasoned fantasy players.

FIG. 3A is a roster 310 set by a team manager user 134. As shown in FIG. 3A, a roster may detail various fields of data about a given player including, but not limited to: Player Name 311, Playing Position 312, Alternative Position 313, Active on Roster 314, Playing Position on Roster 314, and Injured 316. This roster 310 may be viewable by a team manager user 134 via the system 100's GUI 112. The field Player Name 311 notes the name of the player (e.g., Tom Brady) and the field Playing Position 312 notes the normal playing position of the given player (e.g., Quarterback). The Playing Position 312 form may also be used by the system 100 to determine which player(s) on the roster 310 may be slotted into each of the active playing slots available for a given roster 310. For example, in the roster shown in FIG. 3A, there may be one quarterback, one running back, one tight end, three wide receivers, a center, two guards, and two tackles active on the roster 310 at given time (11 players matching the number of players allowed on an NFL team at a given time). Additionally, five backup players are allowed to be designated on the roster 310 in the example shown.

It should be noted the number of active players on a roster 310, number of players allowed to be active at given position at one time, etc. may be edited via team and/or league settings. The system 100 may also be configured to receive any number of different roster compositions (no limiting examples shown in FIGS. 5A-5C). For example, as shown in FIGS. 5A-5C, in the case of fantasy football, a roster may include offensive players, defensive players, and/or special teams players to more closely mimic a real like NFL team's roster of players.

The Alternative Position field 313 further enables the system 100 to substitute players present on the roster 310. Some players are capable of playing multiple positions in real life, and the present system enables such capabilities to be replicated in fantasy sports by noting alternative positions for some players, enabling the system 100 to substitute these multi-positional players on a roster 310 if an active player becomes injured, etc. For example, Jordan Howard is a running back in the NFL, however he is also a somewhat skilled receiver. Although he does not play wide receiver in NFL, he could theoretically play the position if called upon to do so. Accordingly, the system 100 notes in the Alternative Position field 313 for Jordan Howard that he may also be placed as active on the roster at the position of running back. It is worth noting that not all players may have an alternative position, in which case the Alternative Position field 313 may be left blank, noted a "N/A", etc.

The Active on Roster field 314 indicates just that, with 11 players in FIG. 3A being allowed to be noted as active at a given time on a roster 310. The Playing Position on Roster field 315 notes the playing position of active players. For example, Martellus Bennett is noted as playing at Tight End. If a wide receiver was to get injured, Martellus Bennett might be moved from Tight End to Wide Receiver (since he is capable of being placed at both positions on the roster 310), with the Playing Position on Roster field 315 being updated accordingly. The Injured field 316 indicates were a given player has become injured and is thus unavailable and in need of substitution by the system 100. Data regarding injuries may be obtained in real time from one or more sports data sources including: sports statistics databases or websites, RSS feeds, etc.

FIG. 3B is a points scored database 320 for a substitution interval of a competition monitored by the system 100. A shown in FIG. 3B, the system 100 may track the number of fantasy points scored for the active players on a given fantasy roster for a given substitution interval. In this example, the system 100 is monitoring NFL games and the substitution interval is set at quarters, meaning after each quarter of the game, if an injury occurs, a player will be substituted (if available) for any injured players noted as active. Much like the roster shown in FIG. 3A, the points scored database 320 features fields for Player Name 321 and Playing Position on Roster 322. There is also a field which notes the Substitution Interval 323 during which the fantasy points were scored and the number of points scored (Points field 324). There is also a Modifier field 325 which accounts for points deducted from a player's score for being placed out of their natural position on the roster 310 (e.g., a running back placed at wide receiver to cover an injury).

FIG. 3C is a roster 310 automatically updated by the system 100 in response to a substitution event. As shown in FIG. 3C, Julio Jones, previously active on the roster in the position of wide receiver, has become injured. The system 100 will detect such an injury (from a sports data source 120) and update the roster 310 to place an available player capable of playing wide receiver as active on the roster 310 after deactivating the injured player. Such deactivation is demonstrated by the roster record for Julio Jones having the fields Active on Roster 314 changed to "No" and the Playing Position on Roster 315 changed to "N/A". In his place, Jordan Howard has been automatically selected by the system to be activated, with the corresponding database fields (Active on Roster 314 and Playing Position on Roster 315) updated as well.

The system's 100 decision to place Jordan Howard in the game was made, in this example, based off the average points per game scored by the various available players on the roster 310. Such data may be stored in an Average Points Per Game database 330 (shown in FIG. 3D) with the system 100 not only determining which player scores the most points per game, but also how various modifiers applied to the points a player scores might impact that players ability to score points when inserted as active on the roster 310. For example, Jordan Howard was selected by the system 100 to fill the Wide Receiver 1 position on the roster 310. Examining the Average Points Per Game database 330 Jordan Howard scores an average of 5 points per game (Points Per Game field 336) and has been assigned by the system a points modifier (Alternative Position Modifier field 334) of 0.7. Examining the rest of the available players on the roster 310 (also shown in the Average Points Per Game database 330) Marshawn Lynch, Martellus Bennett, Jordan Howard, and Travis Kelce can all be utilized as wide receivers through their ability to be assigned to an alternate position (Alternate Position filed 333). There are no available but inactive wide receivers on the roster.

The system 100 could potentially place Marshawn Lynch, Martellus Bennett, Jordan Howard, or Travis Kelce in the place of the injured Julio Jones. However, Marshawn Lynch is already playing his natural position and noted as scoring an average of 6 points per game. A modifier of 0.6 is assigned to Marshawn Lynch if he was played at his alternate position (wide receiver) meaning the system 100 projects him to score 3.6 points per game when played at his alternate position for an entire game. This same calculation is made by the system 100 for Martellus Bennett (1.8 points per game expected), Jordan Howard (3.5 points per game expected), and Travis Kelce (1.6 points per game expected). Based off these calculations, the system 100 determines that it is better to leave Marshawn Lynch at his natural position (where is can potentially score 6 points per game) and then substitute in Jordan Howard (at his alternative position) to potentially maximize the number of points a given roster 310 might score.

The modifiers mention above may be predefined or determined in real time and based off real life stats which relate to an aptitude required for playing the substitution position. For instance, if Marshawn Lynch begins catching more passes out of the backfield (acting as a receiver) his Alternative Position Modifier field 334 may be altered to deduct less fantasy points for him playing out of position. Additionally, the points per game calculation mentioned here is just one example of how the system 100 might determine which player should be substituted for an unavailable one. For example, real time or historical game statistics can be used to determine if one player is having an unusually good game and substitute that player instead of another player having a less productive outing. The system may also generate an alert to notify end users 130 that the substitution has been made in the form of an SMS message, email, smartphone notification, etc.

The score reducing modifier shown in this example is just one of many modifiers which the system 100 may utilize when calculating the fantasy scores for a given roster 310. For example, the system 100 may also be set up to apply a score enhancing modifier which accounts for clutch plays in a game. If Jordan Howard was to score a touchdown in the final seconds of the fourth quarter of a game, this score might be assigned a score enhancing modifier due to the temporal data related to this score. Other examples could include an interception by a defensive player at the close of a quarter or game and the system 100 may also account for the relative score between teams to apply other modifiers. If, in the examples above, the touchdown or interception late in a game occur during a blowout (with one team losing by a large margin) the score enhancing modifier may not be applied (or reduced in magnitude) by the system 100.

This clutch play modifier may be further reinforced by a choke play modifier which is applied to the player(s) that, for example, allowed the fourth quarter touchdown or interception to occur. This score reducing modifier may interact with other modifiers (as is the case with all modifiers used by the system 100) to provide enhanced realism for fantasy football participants.

Still yet other modifiers may include metadata about the players which impact earned or surrendered fantasy points, scores, etc. For example, if Tom Brady was to be intercepted by a rookie cornerback, the score the rookie cornerback receives might be boosted given Tom Brady's status as one of the best players in the NFL. Additionally, Tom Brady's score might be reduced by a larger amount as compared to giving up an interception to the NFL's best defender, the extra reduction justified by allowing an inexperienced player to get the better of a seasoned pro.

Another modifier may be awarded based off overtime play. In many sports competitions, over time scoring may result in an immediate win for a team and is considered extra important. A modifier may be assigned which reflects the extra importance of performance in this time-span of a game. It should be noted that in some embodiments of the system 100, to access overtime points scored, the player must be substituted into the game prior to overtime, preventing a fantasy team from unfairly benefiting from overtime play after the fact.

FIG. 3E is a points scored database 320 for a substitution interval of a competition monitored by the system 100 featuring a substituted player and points modifier. A shown in FIG. 3B, the system 100 has replaced Julio Jones (injured in the first quarter of his game) with Jordan Howard for the second quarter (Substitution Interval field 323). In this substitution interval, Jordan Howard scored 2 points and thus a modifier of 0.7 (Modifier field 325) will result in 1.4 fantasy points being awarded to this fantasy team.

FIG. 4 is a position score database 340. As shown in FIG. 4, the position of Wide Receiver 1 (Playing Position field 342) was played by two players Julio Jones and Jordan Howard (Player Name Field 341). Expanding on the example discussed above, Julio Jones was injured in Quarter 1 (Substitution Interval field 343) and the system 100 replaced him with Jordan Howard in the Wide Receiver 1 playing position. Julio Jones remained injured for the second and third quarters of his team's game, but was able to return for the fourth quarter. Accordingly, the system reinserted Julio Jones into the Wide Receiver 1 playing position because his points per game average is 4 (as shown in FIG. 3D) versus Jordan Howards 3.5 while playing at his alternative position. Accordingly, the fantasy team is given credit for the points (Points field 344) Julio Jones scored in quarters 1 (1 point) and 4 (2 points), and the points (Points field 344 multiplied by the Modifier field 345) Jordan Howard scored in quarters 2 (1.4 points) and 3 (2.1 points) for a total of 6.5 points at the Wide Receiver 1 position for this week's set of games.

After each week of NFL games concludes, the system 100 calculates which fantasy teams have won their weekly head-to-head matchup and updates the league standings to reflect this information. Also, worth noting is that the system automatically tracks positions at which players are competent so, if for example, a quarterback switches to running back after injuring his throwing hand mid-season, the system will automatically account for this change and fantasy teams with the quarterback turned running back will now be able to play and substitute this player at both the quarterback and running back positions. In one example, the player's position eligibility includes each position for which the player has started a minimum of 20% of the snaps taken by that player. However, the specific threshold for a given league may be configurable by the league manager.

FIG. 5A is a chart of valid offensive player positions that may be chosen by a team manager user 134 as part of an embodiment of the fantasy sports system 100. As shown in FIG. 5A, team manager users 134 may choose from any number of possible combinations of players to place in their starting lineup. League commissioner users 132 may also determine what offensive lineups are allowed in their league; with the idea being each team manager acts more like an NFL coach, choosing a lineup consisting of lineman, backfield players, and receivers. Also noted in FIG. 5A, like real NFL teams, fantasy football teams in one embodiment of the fantasy sports system 100 may have three positional categories to account for: offensive players (discussed above), defensive players (discussed in FIG. 3B), and special teams players (discussed in FIG. 5C).

FIG. 5B is a chart of valid defensive player positions and formations which may be chosen by a team manager user 134 as part of an embodiment of the fantasy sports system 100. Similar to the offensive positional category discussed in FIG. 5A, a team manager user 134 may select for their fantasy team lineman, linebackers, and defensive secondary players similar to what a real NFL coach would do. FIG. 5B further discloses a list of potential defensive formations which may be selected by the team manager user 134 and/or pre-defined by a league commissioner user 132. The defensive formation selected or mandated determines how many of each defensive position player will be in a team's lineup. The formation examples used are merely provided for illustrative purposes, it is understood that additional formations and positions may be included.

FIG. 5C is a chart of valid special teams player positions which may be chosen by a team manager user 134 as part of an embodiment of the fantasy sports system 100. Much like the functionality discussed in FIGS. 5A-5B, team manager users 134 may choose what players they wish to insert into their starting lineup at various special teams positions. Unlike the offensive and defensive playing position categories however, special teams has a set number of players at each position; there are no formation changes that may be made. The rules surrounding formation and player position settings may change as the rules of the NFL (or any other sport which the system is tracking) change and evolve.

While the roster options discussed above allow players a good deal of control, in order to maximize realism, the roster settings for a fantasy team may be matched to those of the active player requirements for a real NFL team. Such rules may include the ability for a fantasy team to carry 53 players on its roster but have only 46 of these players active for each fantasy matchup. Additionally, information such as a fantasy league's salary cap may be made to match the NFL's cap, as well as the rules around trades and the trade deadline. All of these rules and settings are configurable options when a fantasy league is set up and allow for the system to accommodate more traditional or casual fantasy football competitions, while also supporting hyper realistic competitions which mimic the work a real NFL front office undertakes. It should also be noted the number of players to make up a fantasy roster 310 can be altered from embodiment to embodiment of this invention, with the system 100 also being capable of monitoring and auto-substituting whole teams (e.g., Chicago Bears), portions of a team (e.g., one hockey line over another), all the way down to the individual position level depending on the type of fantasy sports competition.

FIG. 6 is an example of a portion of the GUI 112 that the system 100 displays to team manager users 134. As shown in FIG. 6, the roster 310 (shown in FIG. 3A) of a fantasy team may be manipulated through the use of a GUI 112. In this case, the GUI 112 features a breakdown of a portion of the roster 310 in the form of a depth chart. This portion of the GUI 112 enables team manager users 134 to set their preferred order of substitutions in the event an injury, etc. occurs to one of the active players (indicated on the GUI 112 by shading in this case) on the roster 310. The system 100 may use this ranking in part or in whole to determine how substitutions are carried out by the system 100 in response to a substitution event.

For example, if Julio Jones was to become injured, Travis Kelce is noted as being the next wide receiver on the depth chart and, if the system 100 was solely set to substitute players based off the ranking set within the GUI 112, would automatically substitute in Travis Kelce. Alternatively, the system 100 may also utilize various statistics collected about the players on a given roster 310 to automatically substitute another, better performing player and override the substitution order set within the GUI 112. One such example being Jordan Howard who, as discussed in FIGS. 3A-4, could potentially earn more points than Travis Kelce and is thus substituted over him in place of an injured Julio Jones.

The depth chart displayed to team manager users 134 may vary depending on the league settings defined by a league commissioner user 132. For example, in some leagues, once rosters 310 are locked for a week of fantasy sports competition, team manager users 134 may no longer be able to adjust the players which they have set as active on their roster 310 for the week, but the team manager users 134 may be able to adjust back up players for the various active positions post roster 310 lock. If a team manger user 134 anticipates that a player has the potential to have a great week, the manager 134 would not be able to substitute the player in place of a player marked as active on the roster 310 (post roster lock). However, if the backup players have yet to begin their respective real world game(s), the manager 134 could move this player up to be the next in line to be substituted as active on the roster 310 if an injury occurred. The system 100 may also automatically update the order of potential substitutions in real time based off sports statics, etc. The depth chart might also be set to not allow cross substitution of players at various positions, adding more complexity and challenge to constructing a fantasy football roster 310.

The above figures focus on an instance of the system 100 which monitors data from NFL (or college) football games, but the system 100 may also be used for other types of fantasy sports. In the case of fantasy baseball, the system 100 would again have a roster 310 of players, some of whom would be designated as active players and some designated as back-ups. The system 100 would monitor each substitution segment (or interval) of any number of baseball games (each inning being a substitution segment in this example) for the occurrence of a substitution event. A substitution event could be an injury, ejection, etc. which cause a player to become unavailable for play. If such a substitution event was to occur, the system 100 may substitute in the next best available player on the roster 310. Like with the running back playing out of position example given earlier in this application, the system 100 may be configured to apply a score reducing modifier if, for example, an outfielder becomes unavailable and is replaced on the fantasy roster with an infielder. Since the infielder could likely actually play the outfield in real life, but at a reduced capacity versus a full-time outfielder, the score reducing modifier acts to add realism to a substitution made on a fantasy roster 310.

Turning to fantasy hockey, the system 100 may also be configured to monitor and automatically update a fantasy hockey roster 310. Again, similar to the football and baseball examples, a team manager user 134 sets a team roster 310 with various hockey players. Some of these players are designated as active while others are backups. If for example, a goalie is injured in the third period (periods being the substitution segment in this example), the system will automatically substitute in a backup goalie and if one is not available, designated another defenseman as the goalie on the fantasy roster and apply a score reducing modifier to simulate the real-life effect of having a less capable player play the goalie position.

Still yet other sports may be monitored by the present system 100 including golf. In the case of fantasy golf, the roster 310 and number of active players therein might be much smaller (even a single active golfer and one backup) than a baseball or football team but the system 100 can still monitor the performance of the active golfer(s) for injuries, etc. If such a substitution event occurs, the system 100 may sub in another golfer and apply a score reducing modifier if, for example, the back-up golfer is notably less skilled than the originally active golfer.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A computer-implemented method of scoring in a fantasy sports league comprising the steps of:
providing a system server in communication with a sports data server and a weather data server via a communications network;
receiving, in the system server, a sports data source from the sports data server, wherein the sports data source includes real time statistics derived from one or more real life competitions;
receiving, in the system server, real time weather data from the weather data server, wherein the weather data is related to weather conditions specific to each respective one of the one or more real life competitions;
storing, in the system server, a score enhancing modifier, wherein the score enhancing modifier instructs the system server how to modify one or more scores based on the weather data;
receiving, in the system server, a fantasy lineup roster including a plurality of players, each player participating in one of the one or more real life competitions, each player assigned to a playing position and one or more of the plurality of players further assigned to one or more alternative positions, each alternative position being a backup to a playing position or another alternative position;
assigning, by the system server, the one or more scores to each of the plurality of players based on the statistics derived from the one or more real life competitions, wherein the assigned scores are segmented in a manner consistent with a plurality of segments within the one or more real life competitions;

modifying, by the system server, the assigned score of a player in real time by the score enhancing modifier based on the weather data specific to the one of the one or more real life competitions relevant to the statistics upon which that player's assigned score is based;

receiving, in the system server from the sports data server, a notification of at least one substitution event, each substitution event associated with one of the players and also associated with a substitution segment within the one or more real life competitions; and calculating, by the system server, a fantasy lineup score by aggregating the assigned scores of each of the players assigned to a playing position;

wherein, the step of calculating a fantasy lineup score further includes substituting the assigned score for the player assigned to the alternative position that is the backup to the playing position for which the notification of the substitution event relates for all segments within the one or more real life competitions that occur after the substitution segment associated with the substitution event occurs and further modifying the assigned score for the player assigned to the alternative position by a predetermined score reducing modifier that represents a reduced value to the fantasy lineup roster from the player assigned to the alternative position.

2. The method of claim 1, wherein the one or more real life competitions are American football games and the segments within the one or more real life competitions are quarters.

3. The method of claim 1, wherein the one or more real life competitions are American football games and the segments within the one or more real life competitions are time ranges related to a game clock.

4. The method of claim 1, wherein the one or more real life competitions are baseball games and the segments within the one or more real life competitions are innings.

5. The method of claim 1, wherein an additional score reducing modifier is applied to the assigned score for the player assigned to the alternative position that is the backup to the playing position for which the notification of the substitution event relates.

6. The method of claim 5, wherein the magnitude of the additional score reducing modifier applied for the player is derived, at least in part, from at least one sports statistic which correlates an aptitude required for the alternative position at which the player is assigned.

7. The method of claim 1, wherein the score enhancing modifier is derived, at least in part, from temporal data concerning when the assigned score was earned by the player during the one or more real life competition.

8. The method of claim 1, wherein the score enhancing modifier is derived, at least in part, from at least one sports statistic which correlates to the relative aptitude of two or more players participating against one another in the one or more real life competition.

9. The method of claim 1, wherein the substitution event is an injury, illness, ejection, suspension, or benching of a player which occurs during the one or more real-life competition.

10. The method of claim 1, wherein the notification of the substitution event is received from an external sports data source.

11. A fantasy sports system comprising:
a sports data server;
a weather data server;
a system server in communication with the sports data server and the weather data server via a communications network, the system server including:
a memory configured to store a set of instructions; and
a processor configured to execute the set of instructions, wherein, when executed, the set of instructions cause the processor to:
receive a sports data source from the sports data server, wherein the sports data source includes real time statistics derived from one or more real life competitions;
receiving real time weather data from the weather data server, wherein the weather data is related to weather conditions specific to each respective one of the one or more real life competitions;
receiving a score enhancing modifier, wherein the score enhancing modifier instructs the system server how to modify one or more scores based on the weather data;
receive a fantasy lineup roster including a plurality of players, each player participating in one of the one or more real life competitions, each player assigned to a playing position and one or more of the plurality of players further assigned to one or more alternative positions, each alternative position being a backup to a playing position or another alternative position;
assign scores to each of the plurality of players based on statistics derived from the one or more real life competitions, wherein the assigned scores are segmented in a manner consistent with a plurality of segments within the one or more real life competitions;
modifying the assigned score of a player by the score enhancing modifier based on the weather data specific to the one of the one or more real life competitions relevant to the statistics upon which that player's assigned score is based;
receive, from the sports data server, a notification of at least one substitution event, each substitution event associated with one of the players and also associated with a substitution segment within the one or more real life competitions; and
calculate a fantasy lineup score by aggregating the assigned scores of each of the players assigned to a playing position;
wherein, when one of the players assigned to a playing position is associated with a notification of a substitution event, the step of calculating a fantasy lineup score further includes substituting the assigned score for the player assigned to the alternative position that is the backup to the playing position for which the notification of the substitution event relates for all segments within the one or more real life competitions that occur after the substitution segment associated with the substitution event occurs and further modifying the assigned score for the player assigned to the alternative position by a predetermined score reducing modifier that represents a reduced value to the fantasy lineup roster from the player assigned to the alternative position.

12. The system of claim 11, wherein the one or more real life competitions are American football games and the segments within the one or more real life competitions are quarters.

13. The system of claim 11, wherein the one or more real life competitions are American football games and the segments within the one or more real life competitions are time ranges related to a game clock.

14. The system of claim 11, wherein the one or more real life competitions are baseball games and the segments within the one or more real life competitions are innings.

15. The system of claim 11, wherein an additional score reducing modifier is applied to assigned score for the player assigned to the alternative position that is the backup to the playing position for which the notification of the substitution event relates.

16. The system of claim 15, wherein the magnitude of the additional score reducing modifier applied for the player is derived, at least in part, from at least one sports statistic which correlates an aptitude required for the alternative position at which the player is assigned.

17. The system of claim 11, wherein the score enhancing modifier is derived, at least in part, from temporal data concerning when the assigned score was earned by the player during the one or more real life competition.

18. The system of claim 11, wherein the score enhancing modifier is derived, at least in part, from at least one sports statistic which correlates to the relative aptitude of two or more players participating against one another in the one or more real life competition.

19. The system of claim 11, wherein the substitution event is an injury, illness, ejection, suspension, or benching of a player which occurs during the one or more real-life competition.

20. The system of claim 11, wherein the notification of the substitution event is received from an external sports data source.

\* \* \* \* \*